(12) United States Patent
Towley, III

(10) Patent No.: US 7,048,227 B2
(45) Date of Patent: May 23, 2006

(54) PARACHUTE SUPPORTED AIRCRAFT WITH CONTROLLED WING COLLAPSE AND INFLATION

(75) Inventor: Carl K. Towley, III, Alexandria, MN (US)

(73) Assignee: Intellex, Inc., Owatonna, MN (US)

( * ) Notice: Subject to any disclaimer, the term of this patent is extended or adjusted under 35 U.S.C. 154(b) by 0 days.

(21) Appl. No.: 10/705,682

(22) Filed: Nov. 10, 2003

(65) Prior Publication Data

US 2005/0116089 A1    Jun. 2, 2005

(51) Int. Cl.
  *B64C 39/00* (2006.01)
(52) U.S. Cl. ..................................................... 244/13
(58) Field of Classification Search .................. 244/13, 244/16, 138 R, 139, 142, 144, 145, 147, 244/151 R, 151 A, 900, 902, 903, 17, 15; 102/386, 387; 446/49–54, 61–68
  See application file for complete search history.

(56) References Cited

U.S. PATENT DOCUMENTS

| | | | | |
|---|---|---|---|---|
| 2,972,457 A | * | 2/1961 | Steinthal | 244/113 |
| 3,083,933 A | * | 4/1963 | Cella | 244/3 |
| 3,222,014 A | * | 12/1965 | Bowden et al. | 244/113 |
| 3,936,012 A | * | 2/1976 | Murray | 244/16 |
| 3,995,799 A | * | 12/1976 | Bartolini | 244/16 |
| 4,108,402 A | * | 8/1978 | Bowen | 244/139 |
| 4,372,506 A | * | 2/1983 | Cronk et al. | 244/100 R |
| 4,417,707 A | * | 11/1983 | Leong | 244/11 |
| 4,424,945 A | * | 1/1984 | Dell | 244/13 |
| 4,440,366 A | * | 4/1984 | Keeler et al. | 244/138 R |
| 4,445,654 A | * | 5/1984 | Handbury et al. | 244/139 |
| 4,568,043 A | * | 2/1986 | Schmittle | 244/48 |
| 4,596,368 A | * | 6/1986 | Schmittle | 244/48 |
| 4,611,774 A | * | 9/1986 | Brand | 244/54 |
| 4,623,108 A | * | 11/1986 | Musick | 244/13 |
| 4,634,080 A | * | 1/1987 | McNally | 244/13 |
| 4,657,207 A | * | 4/1987 | Poling | 244/21 |
| 4,863,119 A |   | 9/1989 | Case et al. | |
| 4,875,642 A | * | 10/1989 | Flynn | 244/13 |
| 4,930,724 A | * | 6/1990 | Snyder | 244/13 |
| 4,934,630 A | * | 6/1990 | Snyder | 244/13 |
| 5,044,576 A | * | 9/1991 | Inada | 244/13 |
| 5,054,721 A | * | 10/1991 | Brenholt | 244/207 |
| 5,078,335 A | * | 1/1992 | David | 244/2 |
| 5,160,100 A | * | 11/1992 | Snyder | 244/13 |
| 5,620,153 A | * | 4/1997 | Ginsberg | 244/13 |
| 5,901,924 A | * | 5/1999 | Strieber | 244/13 |

(Continued)

OTHER PUBLICATIONS

Magazine page showing Condor ultralight, (undated).

(Continued)

*Primary Examiner*—Michael J. Carone
*Assistant Examiner*—S A Holzen
(74) *Attorney, Agent, or Firm*—James W. Miller

(57) ABSTRACT

This invention relates to a parachute supported aircraft having a frame and a seat for supporting at least a pilot. A parachute is coupled to the frame by a plurality of riser lines for allowing the parachute to inflate and form a wing for lifting the frame. A pair of upwardly extending masts are coupled to the frame. Each mast supports a vertically displaceable sleeve receiving a group of riser lines. Control cables connected to a winch raise and lower the sleeves to allow the pilot to selectively collapse and inflate the wing in a controlled fashion. A wing elevating cord can be used by the pilot to help pull the parachute from a generally vertical, partially inflated, lockout position into a generally horizontal, more inflated, flight position.

28 Claims, 7 Drawing Sheets

U.S. PATENT DOCUMENTS

| | | | |
|---|---|---|---|
| 5,904,324 A * | 5/1999 | Di Bella | 244/152 |
| 6,293,490 B1 * | 9/2001 | Villinger | 244/16 |
| 6,322,021 B1 * | 11/2001 | Fisher et al. | 244/49 |
| 6,360,991 B1 * | 3/2002 | Alan | 244/103 W |
| 6,622,968 B1 * | 9/2003 | St. Clair et al. | 244/138 R |
| 6,659,403 B1 * | 12/2003 | Hsia | 244/123.11 |
| 6,676,084 B1 * | 1/2004 | Asseline et al. | 244/152 |
| 6,743,830 B1 * | 6/2004 | Soane et al. | 521/83 |
| 6,808,144 B1 * | 10/2004 | Nicolai et al. | 244/139 |
| 2002/0190157 A1 * | 12/2002 | Asseline et al. | 244/13 |
| 2005/0247819 A1 * | 11/2005 | Caruso | 244/2 |

OTHER PUBLICATIONS

Photograph showing Paramast ultralight, (undated).
Brochure showing Rapid Lauch ultralight, (undated).

* cited by examiner

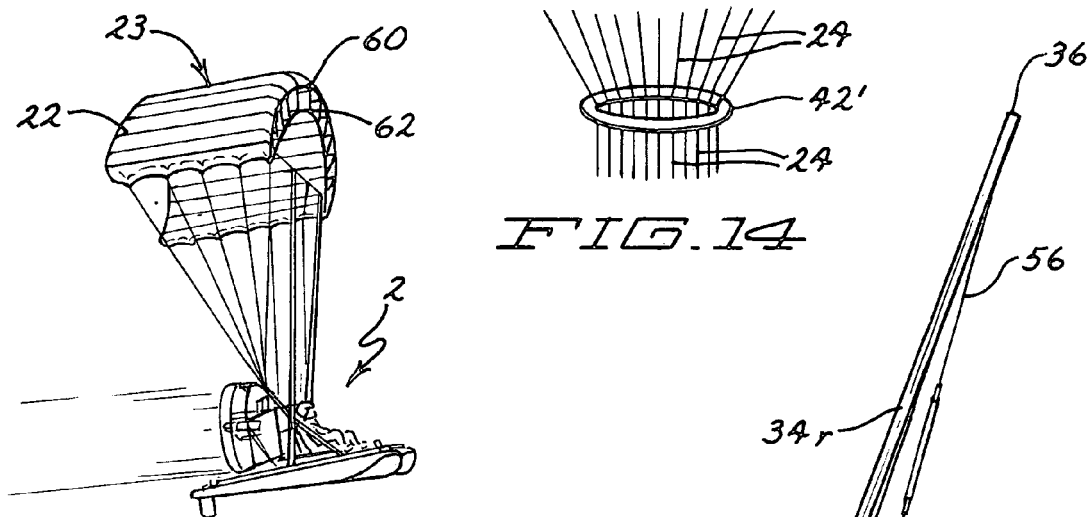
FIG. 14
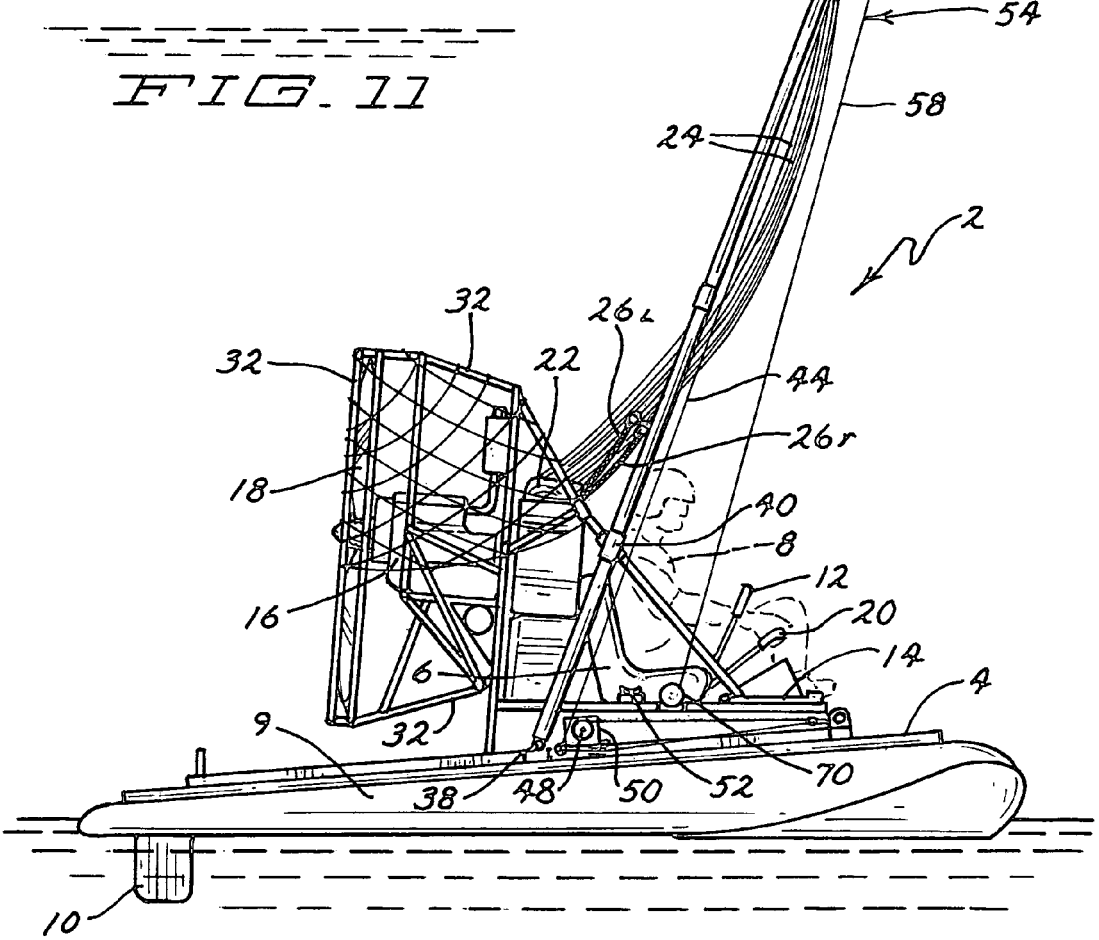
FIG. 11
FIG. 1

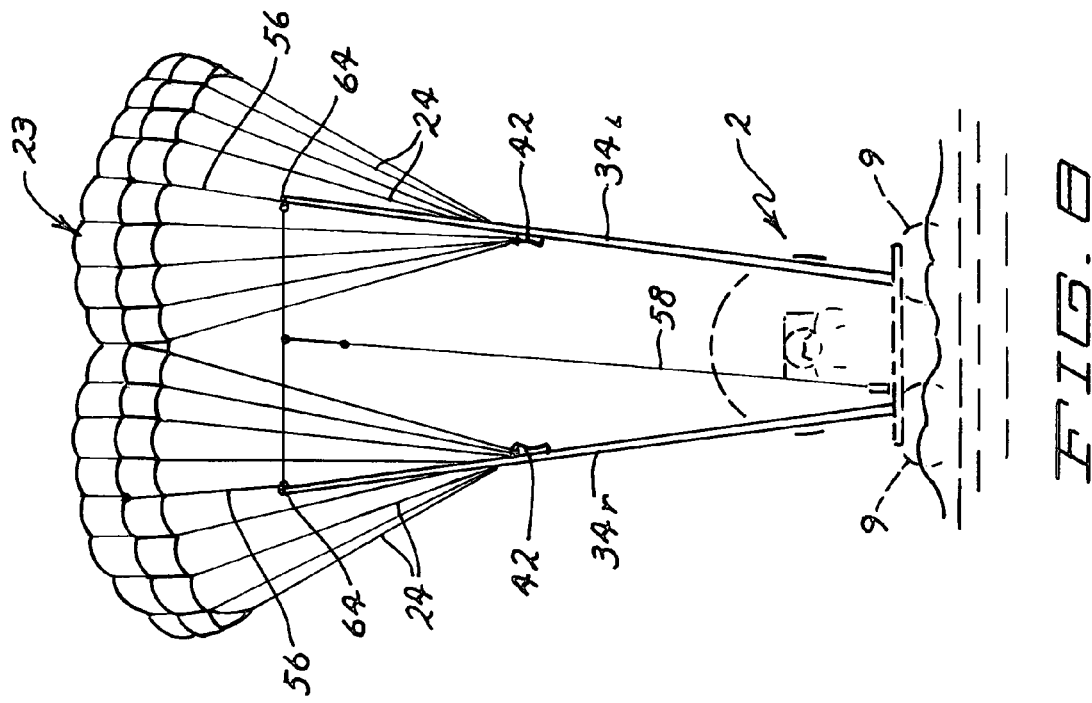
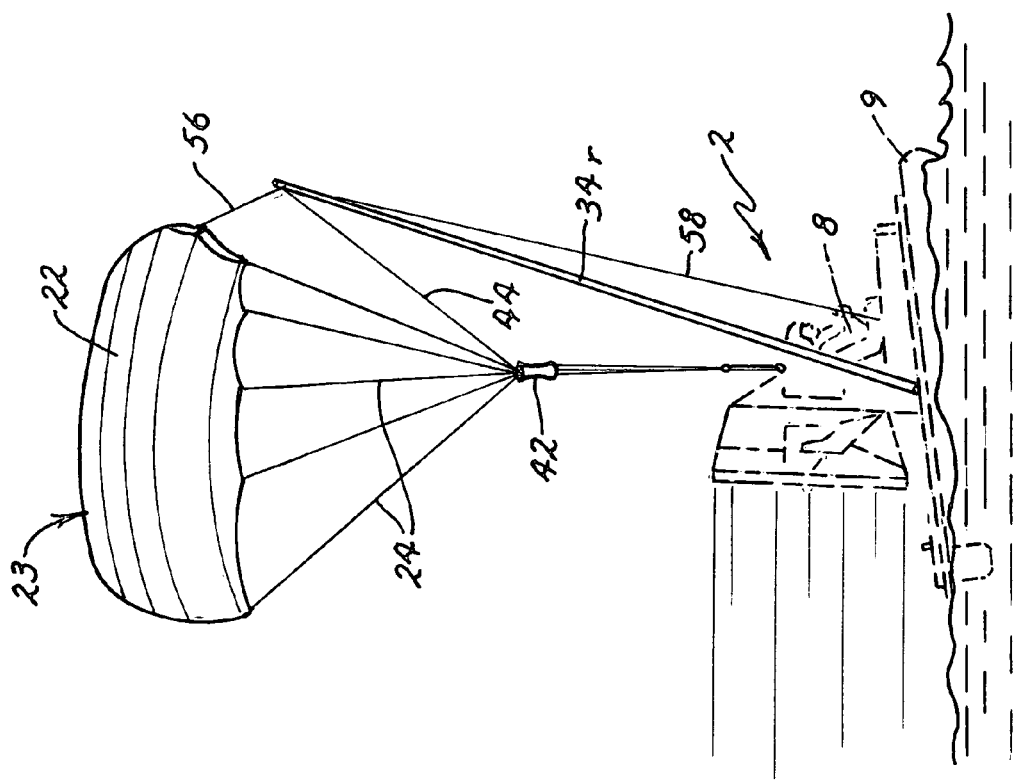

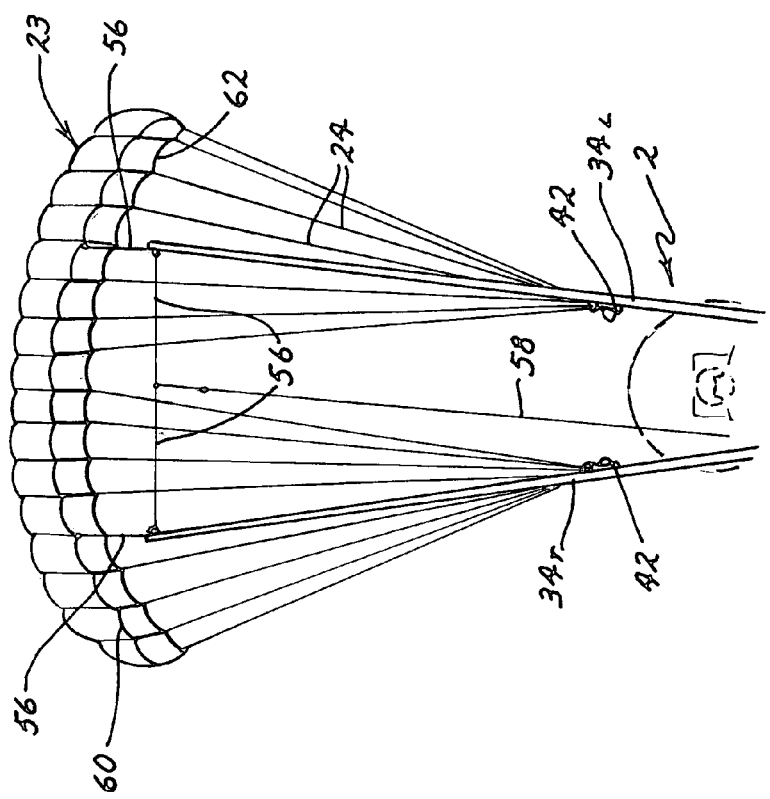
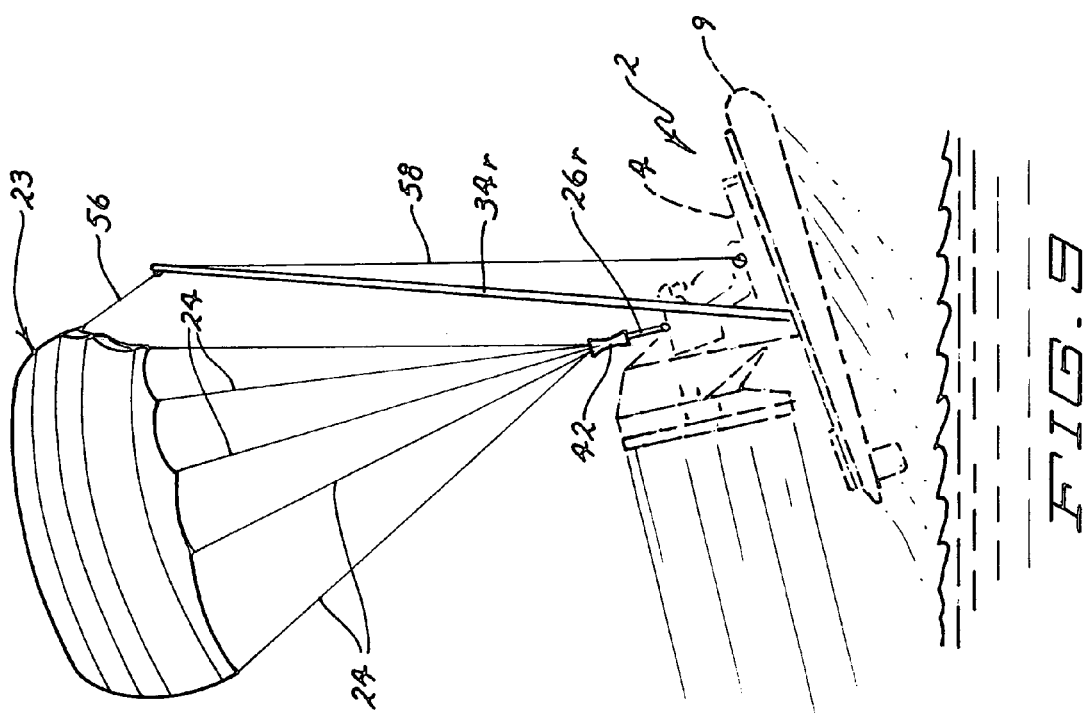

PARACHUTE SUPPORTED AIRCRAFT WITH CONTROLLED WING COLLAPSE AND INFLATION

TECHNICAL FIELD

This invention relates to an ultralight aircraft supported in flight by a wing formed by an inflated parachute. More particularly, this invention relates to a powered parachute (PPC) aircraft.

BACKGROUND OF THE INVENTION

Powered parachute (PPC) aircraft are well known ultralight aircraft. A typical powered parachute aircraft comprises a rigid frame that carries a small engine and rearwardly facing propeller. A parachute is attached or connected to the frame by a plurality of riser lines. When the engine is in operation and the propeller is turning, the parachute inflates and forms a lift generating wing that supports the aircraft in flight.

To prepare such an aircraft for takeoff, the parachute needs to be stacked in folds with the parachute lying in a semi-circle on top of the ground behind the aircraft. All of the riser lines have to be taut and free of tangles without any sticks or debris being present in the riser lines or in the path immediately ahead of the parachute. If a twig or other obstruction were to tangle in the riser lines during takeoff, the takeoff would have to be aborted. It easily takes 30 minutes or so to properly arrange the parachute and riser lines behind the frame to prepare the aircraft for takeoff. This detracts from the enjoyment of using such an aircraft since the need to carefully prepare the parachute and riser lines prior to each takeoff is time consuming and onerous.

Some powered parachute aircraft have been designed with floats for taking off from a body of water. However, this usually requires a launch from the shoreline of the body of water since it is necessary to arrange the parachute and riser lines on a solid ground surface such as the beach. With the parachute laid out on the beach and the frame of the aircraft resting in the water, takeoff can then be attempted by powering away from the beach, thereby pulling the parachute up off the beach and inflating it. However, this restricts where a float supported aircraft can be launched and requires the presence of a relatively deserted section of shoreline.

Moreover, with prior art float supported aircraft of this type, if a takeoff run is aborted for some reason, or if a landing occurs in the middle of the body of water instead of landing near the shoreline and running the aircraft up onto the shoreline, the parachute collapses as the aircraft slows and can easily hit the water. If this occurs, the parachute quickly becomes waterlogged bringing the aircraft to a complete and abrupt stop. Before the aircraft can be flown again, the pilot has to get the parachute out of the water, return the aircraft to the beach, get the parachute dried and laid out behind the aircraft with all the riser lines taut and unentangled, etc., which takes considerable time. In addition, the act of hauling the parachute out of the water is very difficult and physically strenuous.

With known powered parachute aircraft in which the parachute has to be laid out behind the frame of the aircraft prior to takeoff, the parachute is also exposed to the prop blast as it lies on the ground and as it is pulled up behind the aircraft by forward motion of the aircraft. As a result, the pilot has to warm up the engine and perform all necessary preflight power checks prior to laying the parachute out on the ground or the prop blast will immediately disrupt the neat and precise arrangement of the parachute and the riser lines required for takeoff. However, many pilots instinctively perform engine run ups and the like immediately prior to taking off and consequently often disrupt the parachute and riser line placement. This then requires the pilot to shut the engine off and to take the time needed to straighten out the riser lines and parachute and rearrange them in back of the aircraft.

Thus, as a consequence, while known powered parachute aircraft are safe and relatively easy and fun to fly, the time and work required to arrange them for takeoff is a disadvantage and detracts from their enjoyment. Moreover, the need to properly arrange the parachute and lay out the riser lines on the ground limit how some types of these aircraft, e.g. an aircraft supported by floats for operation on water, can be launched. Accordingly, there is a need in the art for a powered parachute aircraft that is easier to launch, taxi and land as well as being easier to prepare for takeoff.

SUMMARY OF THE INVENTION

This invention relates to a parachute supported aircraft comprising a frame and a wing connected to the frame for lifting the frame, the wing being formed by a parachute. One aspect of this invention is to provide such an aircraft with a means for providing controlled wing collapse and inflation during landing and takeoff respectively.

Another aspect of this invention is to provide such an aircraft with at least one sleeve supported for vertical movement upwardly and downwardly relative to the frame. The sleeve is located relative to the frame and the parachute such that the parachute riser lines pass through the sleeve as the riser lines extend between the parachute and the frame. Thus, the sleeve as it rises relative to the frame progressively gathers in the riser lines to thereby collapse the wing and the sleeve as it lowers relative to the frame progressively releases the riser lines to allow expansion of the riser lines to permit the wing to inflate.

Yet another aspect of this invention is such an aircraft having at least one mast extending upwardly from the frame. The parachute is flexibly tethered to the mast between the frame and the parachute as riser lines connect the parachute to the frame.

An additional aspect of this invention relates to such an aircraft having a wing elevating cord extending from the frame to the parachute. The wing elevating cord is selectively usable by the pilot to help pull on the parachute to aid the parachute in transitioning from a generally vertical, partially inflated, lockout position to a generally horizontal, more inflated, flight position.

Another aspect of this invention relates to a powered parachute supported aircraft which comprises a frame having at least one seat for carrying at least a pilot. A parachute forms a collapsible and inflatable wing. A plurality of riser lines connect the parachute to the frame. An engine and propeller are provided to allow the aircraft to be self-powered. At least the propeller is unshrouded.

Yet another aspect of this invention relates to a method of operating a parachute supported aircraft having a frame supported in flight by a parachute comprising a collapsible and inflatable wing. The parachute is connected to the frame by a plurality of riser lines. The method comprises maintaining tension in the riser lines during and immediately after landing as the wing collapses to avoid tangling the riser lines.

Another aspect of this invention relates to an additional method of operating a parachute supported aircraft. The method comprises controlling the inflation of the wing during taxiing and takeoff and controlling the collapse of the wing during and immediately after landing.

BRIEF DESCRIPTION OF THE DRAWINGS

This invention will be described more completely in the following Detailed Description, when taken in conjunction with the following drawings, in which like reference numerals refer to like elements throughout.

FIG. 1 is a side elevational view of the powered parachute aircraft according to this invention, particularly illustrating the aircraft at rest on a body of water prior to takeoff with the vertically movable sleeves having been elevated, with the riser lines having been substantially gathered in by the sleeves to substantially collapse the parachute, and with the parachute being stored behind the pilot;

FIG. 7 is a side elevational view of the powered parachute aircraft of FIG. 1, particularly illustrating the aircraft powering up on a body of water in a takeoff run with the parachute having been further inflated and having risen to an overhead flight position with the vertically movable sleeves having been partially lowered to partially release the riser lines for expansion and with the wing elevating cord having been used as the sleeves were lowered to elevate the leading edge of the parachute to help the parachute assume an overhead flight position and form a wing;

FIG. 8 is a front elevational view of the powered parachute aircraft of FIG. 1, particularly illustrating the aircraft in the same condition as is depicted in FIG. 7 with the shape of the wing provided by the parachute being partially corrupted;

FIG. 9 is a side elevational view of the powered parachute aircraft of FIG. 1, particularly illustrating the aircraft taking off of a body of water to achieve flight with the parachute having been fully inflated while in its overhead flight position with the vertically movable sleeves having been fully lowered to completely release the riser lines for full expansion;

FIG. 10 is a front elevational view of the powered parachute aircraft of FIG. 1, particularly illustrating the aircraft in the same condition as is depicted in FIG. 9 with the shape of the wing provided by the parachute being uncorrupted;

FIG. 11 is a perspective view of the powered parachute aircraft of FIG. 1 while in flight;

FIG. 14 is a perspective view of an alternative form of the sleeves.

DETAILED DESCRIPTION

Figure 2:
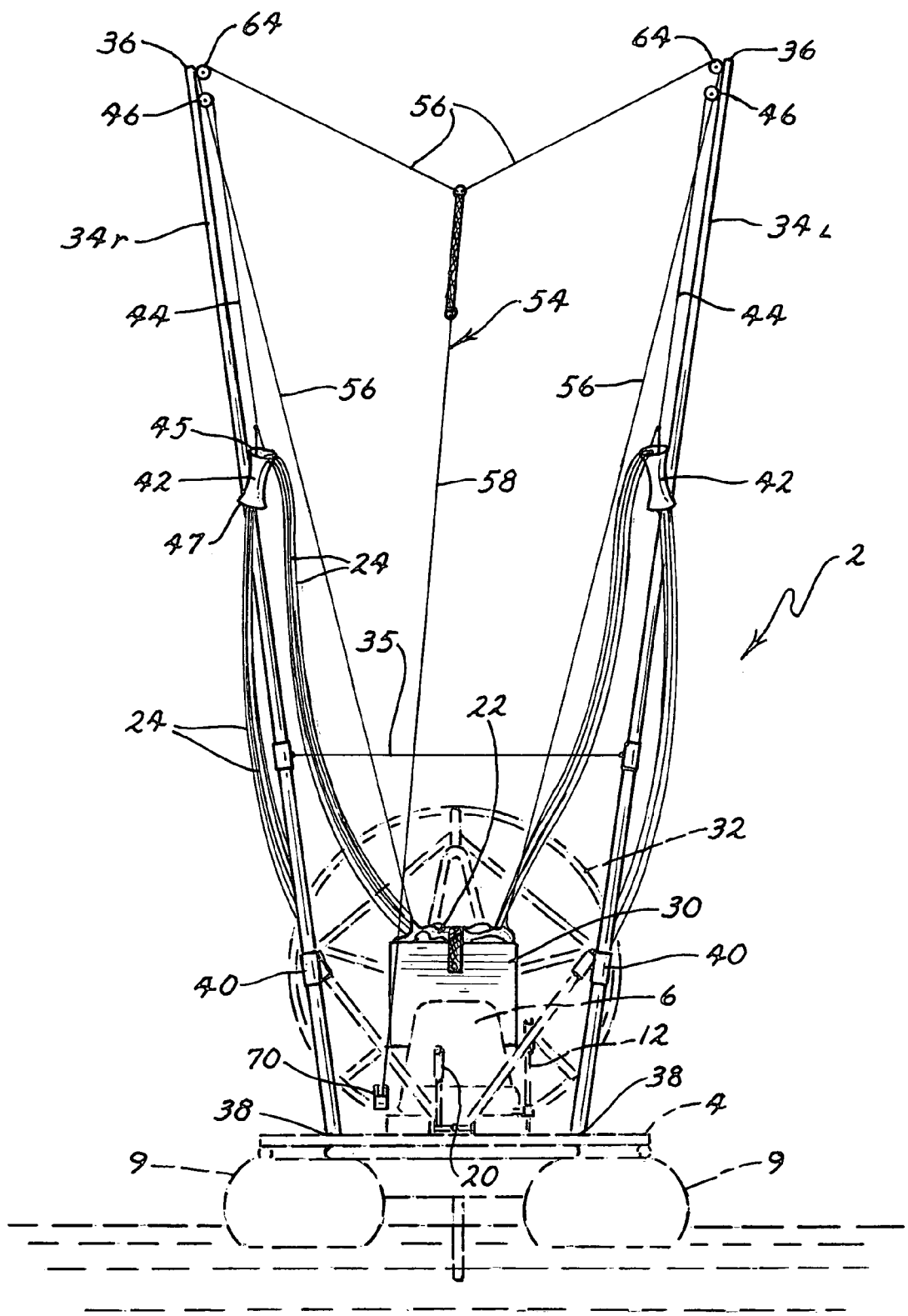
FIG. 2 is a front elevational view of the powered parachute aircraft of FIG. 1, particularly illustrating the aircraft in the same condition as is depicted in FIG. 1.

A powered parachute aircraft according to this invention is illustrated generally as 2 in the drawings. The structure of aircraft 2 will be first described in this Detailed Description by referring mainly to FIGS. 1 and 2. Then, various flight operations of aircraft 2 will be described, such as taxiing, takeoff, landing, etc., by referring mainly to FIGS. 3–12. Finally, various operational characteristics of aircraft 2 will be reviewed and distinguished from prior art aircraft.

The Structure of Aircraft 2

Referring to FIGS. 1 and 2, aircraft 2 comprises a frame 4 having a seat 6 for carrying a pilot 8. Frame 4 could be lengthened or widened to provide additional seat(s) (not shown) for carrying passenger(s). Aircraft 2 as shown in FIG. 1 is a type of aircraft often generically referred to as an ultralight.

Frame 4 is supported by a pair of floats 9 to allow aircraft 2 to take off and land on a body of water. The rear of frame 4 includes a pivotal rudder 10 to provide directional control while taxiing. A rudder control handle 12 is provided adjacent pilot's seat 6 for allowing pilot 8 to pivot rudder 10. Rudder 10 and rudder control handle 12 are used only when aircraft 2 is in contact with the body of water. Once aloft, aircraft 2 is directionally steered by a pair of foot operated steering bars 14 in a manner well known in the powered parachute aircraft art.

Alternatively, floats 9 could be replaced with wheels (not shown) for allowing aircraft 2 to take off and land on the ground. In this alternative, at least some of the wheels would be steerable to provide directional control while on the ground. A steering wheel (not shown) operatively connected to the steerable wheels would replace rudder control handle 12.

Frame 4 carries a small internal combustion engine 16 that powers aircraft 2. Engine 16 turns a rearwardly facing propeller 18. When propeller 18 is turning, propeller 18 moves aircraft 2 forwardly with the prop blast from propeller 18 exiting rearwardly over the rear of frame 4. A throttle 20 is placed near pilot's seat 6 to allow pilot 8 to throttle engine 16 up and down to taxi and fly aircraft 2.

A conventional ram air parachute 22 is connected to frame 4 by a plurality of riser lines 24. Parachute 22 forms a collapsible and inflatable wing 23 providing lift for aircraft 2. Riser lines 24 are anchored in two groups to opposite lateral sides of frame 4 of aircraft 2 by a pair of flexible anchor straps 26 secured to some of the tubing forming frame 4. A right anchor strap $26_r$ anchors half of riser lines 24 to the right side of frame 4 and a left anchor strap $26_l$ anchors the other half of riser lines 24 to the left side of frame 4. In FIG. 1, the right and left anchor straps $26_r$ and $26_l$ appear to be anchored to the same side of frame 4 but this is due to the side elevational view provided by FIG. 1. In reality, the left anchor strap $26_l$ is anchored to the left or far side of frame 4 in FIG. 1 with the near side of frame 4 in FIG. 1 being the right side of frame 4.

Parachute 22 as shown in FIGS. 1 and 2 is packed into a storage box 30 carried on frame 4 between pilot's seat 6 and engine 16. Only the top of parachute 22 can be seen in FIGS. 1 and 2 sticking up out of storage box 30. Obviously, during use of aircraft 2, parachute 22 will be removed from storage box 30 and unfurled. A cylindrical, cage-like prop guard 32 surrounds propeller 18 and engine 16 to prevent parachute 22 from fouling propeller 18. However, as will be explained later, an aircraft 2 according to this invention permits prop guard 32 to be removed if so desired.

A pair of upwardly extending masts 34 are connected at their lower ends to each side of frame 4 thus forming a right mast $34_r$ and a left mast $34_l$. Referring to FIG. 1, each mast 34 is connected to frame 4 slightly to the rear of pilot's seat 6 and then is raked or angled forwardly such that the tip 36 of mast 34 is located further forwardly and slightly ahead of pilot's seat 6. As shown in FIG. 2, each mast 34 is also raked or angled laterally outwardly such that each mast tip 36 is laterally outboard of a lower pivotal connection 38 of mast 34 to frame 4. While the forward and lateral raking of masts 34 as depicted in FIGS. 1 and 2 is preferred for reasons that will be explained hereafter, different mast orientations could be used such as vertical masts without any forward or lateral raking.

During use of aircraft 2, the lower end of each mast 34 is connected to frame 4 by a lower pivotal connection 38 and by an upper fixed connection 40. Pivotal connection 38 can comprise a simple pivot pin which pivotally connects mast 34 to frame 4. Upper fixed connection 40 can be anything that fixedly secures mast 34 to some of the side tubing of frame 4. Various forms of fixed connections 40 could be used including clamping, lashing or bolting mast 34 to the side tubing of frame 4.

Each mast 34 is flexible with each mast 34 being made using the same materials and the same methods as are used to make pole vaulting poles. While aircraft 2 is operated, the lower portion of mast 34, namely the length of mast 34 between the upper and lower connections 38 and 40, remains relatively rigid and does not normally flex much if at all. However, the remaining unsupported upper portion of mast 34, namely the length of mast 34 between upper connection 40 and mast tip 36, can longitudinally bend or flex fore and aft about its fixed connection 40 to frame 4 without fracturing. As shown in FIG. 2, a lateral guy wire 35 can extend between masts 34 to provide additional lateral support or bracing for masts 34.

To more easily store or transport aircraft 2 on a trailer, the fixed connection 40 of the lower ends of mast 34 to frame 4 can be loosened or released to permit masts 34 to be pivoted about lower pivotal connection 38 to lie flat on top of frame 4. In this storage or transport position (not shown), tips 36 of masts 34 will then extend over the forward end of frame 4 and could be supported by a yoke that is provided on the trailer. In addition, by making fixed connection 40 adjustable on the side tubing of frame 4, connection 40 could be slid up and down on the tubing of frame 4 to be able to adjust the angle of forward inclination of masts 34.

A vertically movable sleeve 42 is supported from the top of each mast 34. Each sleeve 42 is hollow and a group of riser lines 24 passes through each sleeve 42. For example, the group of riser lines 24 anchored to the right anchor strap $26_r$ passes through one sleeve 42 carried on right mast $34_r$.

Similarly, the group of riser lines 24 anchored to the left anchor strap $26_l$ passes through the other sleeve 42 carried on left mast $34_l$.

As shown in FIG. 2, each sleeve 42 is supported from the top of mast 34 by a sleeve control cable 44. One end of sleeve control cable 44 is connected to the top 45 of sleeve 42. Sleeve control cable 44 then passes up over a first pulley 46 on the top of each mast 34 and then extends downwardly along mast 34 as shown in FIG. 1. Sleeve control cable 44 is then routed around various pulleys on frame 4 until the other end of sleeve control cable 44 is finally wound around drum 48 of an electric winch 50. Since there are two sleeves 42, there are two sleeve control cables 44 with the lower end of each sleeve control cable 44 being attached to drum 48 of winch 50.

A winch control switch 52 is positioned near pilot's seat 6. Pilot 8 can selectively operate winch 50 using switch 42 to control the vertical displacement of sleeves 42, as will be explained in more detail hereafter. Winch 50 is operated by any suitable source of electric power carried on frame 4. This power source is preferably an alternator (not shown) coupled to engine 16 but could additionally or alternatively comprise a small battery (not shown) carried on frame 4.

Desirably, winch 50 is able to elevate sleeves 42 fairly rapidly relative to masts 34. A stock 2500 pound electric winch of the type often found on all terrain vehicles (ATV) has been found by the Applicant to have sufficient power to elevate sleeves 42, but can take more than 15 seconds to move sleeves 42 from a fully lowered position adjacent anchor straps 26 to a fully elevated position within a foot or two of mast tips 36. This time can be decreased by installing larger drums 48 on such a winch 50. For example, the time can be decreased to less than 9 seconds by installing a 6 inch drum 48 on a standard ATV winch 50. Alternatively, a variable speed winch 50 could be used with pilot 8 selecting a particular speed. The speed of winch 50 influences the takeoff and landing distances, namely faster winch speeds allow aircraft 2 to takeoff and land in shorter distances and vise versa.

Each sleeve control cable 44 is wound around drum 48 of winch 50 in the same direction to be taken up as winch 50 is operated in one direction and to be released or payed out as winch 50 is operated in the other direction. When winch 50 is operated in the direction that winds up sleeve control cables 44 on drum 48, cables 44 will be pulled upwardly along masts 34 to elevate sleeves 42. When winch 50 is operated in the other direction to allow cables 44 to pay out from drum 48, sleeves 42 will be forced downwardly by the tension in riser lines 24, as will be explained in more detail hereafter.

Alternatively, a pair of sleeve control cables 44 (not shown) could be provided for each sleeve 42 with one cable 44 being secured to the top 45 of sleeve 42 and the other cable 44 being secured to the bottom 47 of sleeve 42. The pair of cables 44 from each sleeve 42 would then be attached to drum 48 in opposition to one another, with operation of winch 50 winding up one cable 44 as winch 50 is operated in one direction and with winch 50 winding up the other cable 44 as winch 50 is operated in the opposite direction. In this alternative, sleeve 42 would be positively elevated by one cable 44 and positively lowered by the other cable 44.

Each sleeve 42 has a flared or trumpet shaped top 45 and bottom 47 as shown in FIG. 2. Thus, riser lines 24 can pass through each sleeve 42 and wrap or bend over the flared top 45 and bottom 47 of each sleeve 42 to slide more smoothly through each sleeve 42. However, sleeve 42 could have other shapes, such as a cylindrical sleeve without trumpet shaped upper and lower ends, or such as a sleeve 42' comprising a simple ring or washer having little or no thickness as shown in FIG. 14. Accordingly, sleeves 42 need not have a specific size and/or shape as their purpose is simply to gather in riser lines 24 as sleeves 42 rise and to release riser lines 24 as sleeves 42 lower.

Some wear on riser lines 24 will occur over time as riser lines 24 pass through sleeves 42 and sleeves 42 rise up and down. If so desired, a riser line 24 capable of easily showing wear could be used, such as a riser line 24 having an inner core (not shown) made from one color, such as white, covered by an outer jacket or sheath (not shown) made from another color, such as black. When riser line 24 wears, eventually the inner core will show through the outer sheath at worn spots in the outer sheath, alerting pilot 8 to wear on the riser lines 24 and the need to replace any such affected riser lines.

A T-shaped wing elevating cord 54 having lateral branches 56 and a central branch 58 connects to the upper leading edge 60 of wing 23 created by a fully inflated parachute 22. FIG. 11 shows aircraft 2 in flight with a fully inflated wing 23. Such a wing 23 has a thickness defined between upper and lower leading and trailing edges with the leading edges of wing 23 being visible in FIG. 11 and with the trailing edges of wing 23 being hidden in FIG. 11. The upper leading edge, indicated as 60 in FIG. 11, is the uppermost of the two leading edges while the lower leading edge, indicated as 62 in FIG. 11, is the lowermost of the two leading edges. As just noted, wing elevating cord 54 preferably attaches to the upper leading edge of wing 23 by being sewn or attached to loops (not shown) inside some of the cells of parachute 22.

Figure 6:
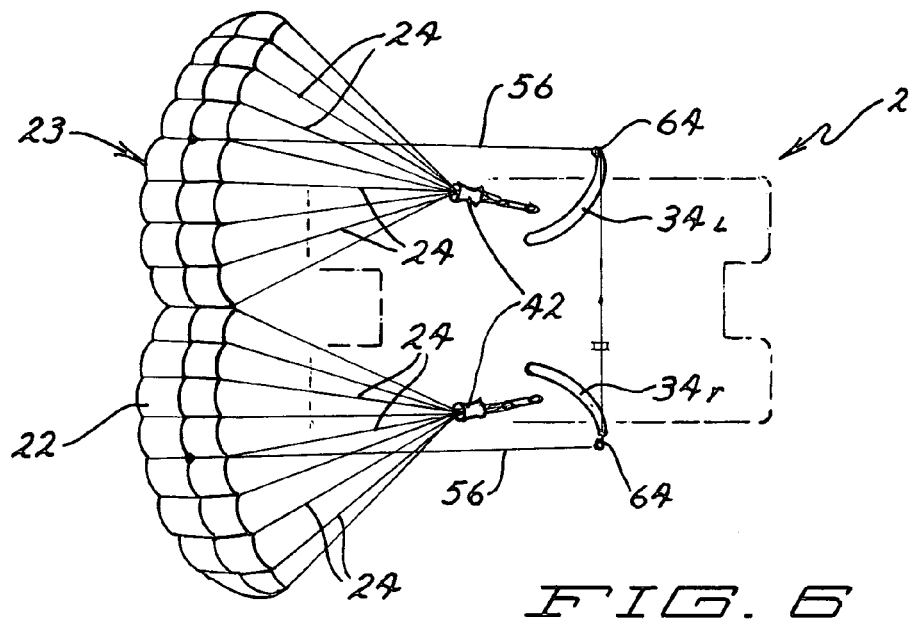
FIG. 6 is a top plan view of the powered parachute aircraft of FIG. 1, particularly illustrating the aircraft in the same condition as is depicted in FIG. 5.

The two lateral branches 56 of wing elevating cord 54 are each routed through a second pulley 64 carried on top of each mast 34. Lateral branches 56 attach to upper leading edge 60 of wing 23 generally at the center of each half of wing 23. Thus, as shown in FIG. 6 which shows a partially inflated wing 23, one lateral branch 56 of cord 54 attaches to upper leading edge 60 on one side of wing 23 generally midway between the longitudinal centerline of wing 23 and one tip of wing 23. The other lateral branch 56 of cord 54 attaches to the other side of wing 23 generally at the same position, namely to upper leading edge 60 generally midway between the longitudinal centerline of wing 23 and the opposite wing tip. Thus, if wing elevating cord 54 is pulled downwardly over pulleys 64, as will be described in more detail hereafter, the lateral branches 56 of wing elevating cord 54 will pull on upper leading edge 60 of wing 23 in a symmetrical fashion.

Lateral branches 56 of cord 54 can extend generally straight back from mast tips 36 as shown in the drawings. In this respect, the outward lateral taper of masts 34, i.e. the fact that masts 34 get farther apart as they rise, helps connect lateral branches 56 of cord 54 to upper leading edge 60 of wing 23 well outboard of the longitudinal centerline of wing 23. In addition, lateral branches 56 of cord could extend laterally outwardly from mast tips 36 as they extend back to connect to upper leading edge 60 of wing 23 such that the lateral branches 56 are attached to wing 23 even laterally outboard of mast tips 36. Getting the attachment points of lateral branches 56 of cord 54 well outboard on wing 23, i.e. at least midway from the wing centerline to the wing tip, helps wing 23 more fully and quickly inflate when cord 54 is used to elevate parachute 22.

Central branch 58 of wing elevating cord 54 extends downwardly between masts 34 to pass close by pilot's seat 6. The lower end of central branch 58 of wing elevating cord 54 is connected to a spring retractor 70 of the type often used in dog leashes. The purpose of retractor 70 is not to lock cord 54 in place since retractor 70 is preferably used in a non-locked, full retraction mode. Instead, spring retractor 70 takes up any slack that may appear in cord 54 during use of cord 54. As will be apparent from the following operational description of aircraft 2, any spring force provided by retractor 70 serving to take up cord 54 can be overcome by movement of wing 23 during flight or when wing 23 provided by parachute 22 collapses following landing.

While aircraft 2 described herein is self-powered due to the presence of engine 16 and propeller 18, engine 16 and propeller 18 could be eliminated if some other propulsion source were available, such as being towed by a boat or car. Thus, this invention is not limited to powered parachute aircraft, but could include unpowered parachute aircraft in the nature of a parasail or the like. Such an unpowered aircraft according to this invention would be built much like what has been described herein including frame 4, parachute 22, masts 34, sleeves 42, etc., except that engine 16, propeller 18, and prop guard 32 will be omitted.

Flying the Aircraft 2

FIGS. 1 and 2 illustrate aircraft 2 prior to operation with parachute 22 stored in storage box 30. sleeves 42 are positioned slightly more than halfway up masts 34. Each group of riser lines 24 passes upwardly from their anchor straps 26, through sleeves 42, and then back downwardly to the stored parachute 22. The top of storage box 30 is open such that parachute 22 is free to be pulled out of storage box 30 at anytime.

Figure 4:
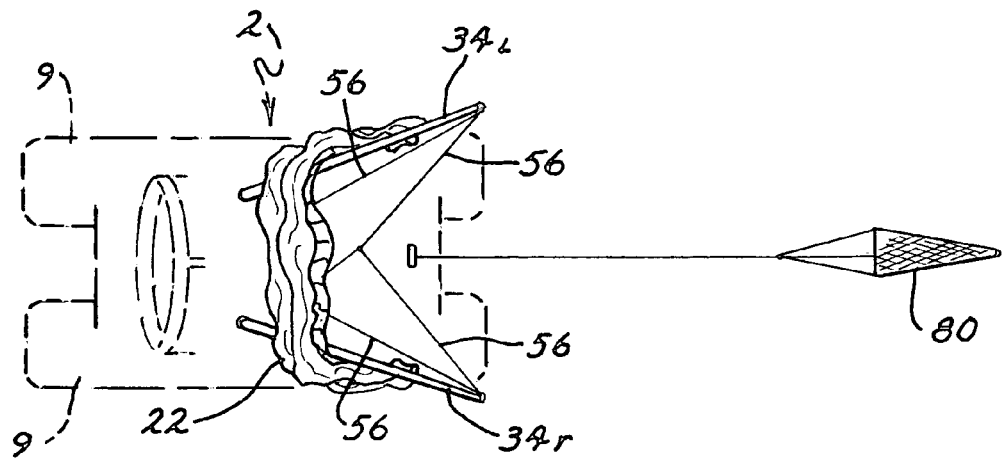
FIG. 4 is a top plan view of the powered parachute aircraft of FIG. 1, particularly illustrating the aircraft in the same condition as is depicted in FIG. 3.
Figure 3:
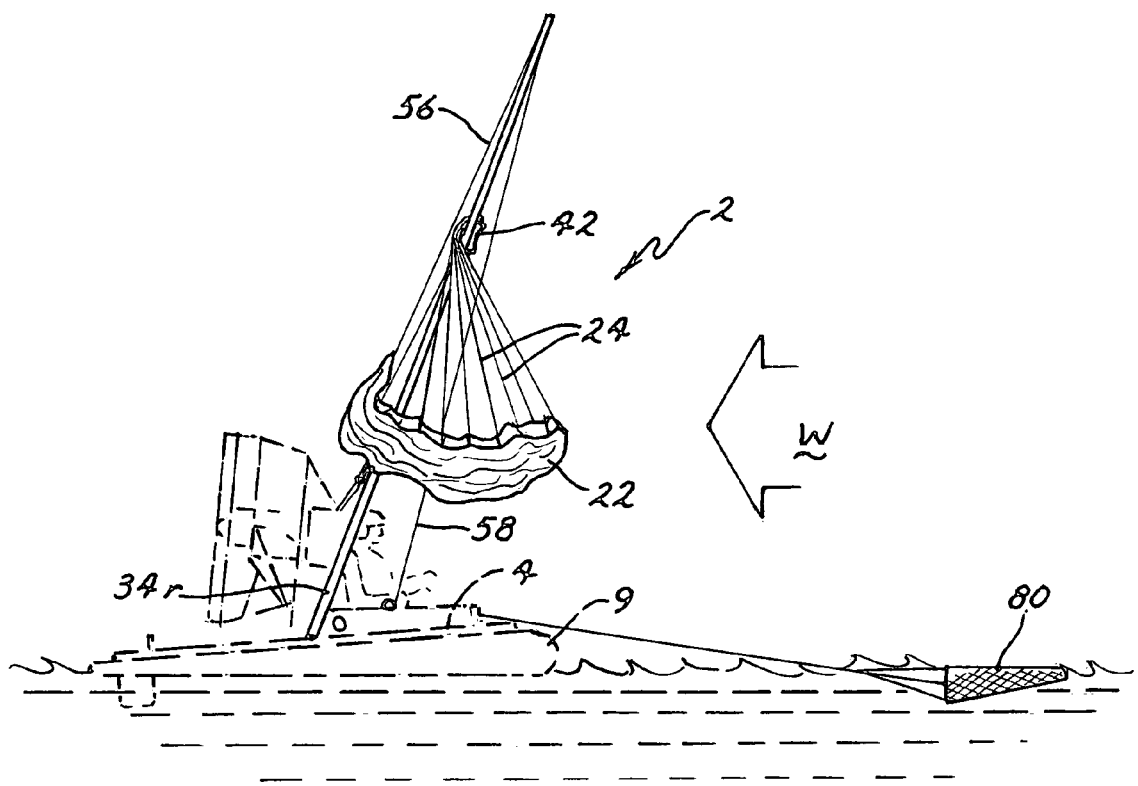
FIG. 3 is a side elevational view of the powered parachute aircraft of FIG. 1, particularly illustrating the aircraft at rest on a body of water prior to takeoff with the parachute having been released from storage but with the parachute uninflated to hang inverted above the pilot and with a sea anchor having been deployed to keep the nose of the aircraft into the wind.

The first step in preparing aircraft 2 for takeoff is to pull parachute 22 out of storage box 30 to unfurl parachute 22. In aircraft 2 of this invention, this can be done simply by operating winch control switch 52 to raise sleeves 42 further upwardly along masts 34 from the position shown in FIG. 2. This will effortlessly pull parachute 22 up out of storage box 30 until parachute 22 clears storage box 30 and hangs in an inverted position from sleeves 42 as shown in FIGS. 3 and 4. Pilot 8 can move or shake wing elevating cord 54 back and forth to shake out any folds in parachute 22. Alternatively, instead of using winch 50 and sleeves 42 to pull parachute 22 from storage box 30, pilot 8 could also manually pull parachute 22 out of storage box 30.

FIGS. 3 and 4 illustrate aircraft 2 at rest tethered to a sea anchor 80 to keep the nose of aircraft 2 into the wind, the arrow W in FIG. 3 representing wind direction. Parachute 22 has been unfurled from storage box 30. Sleeves 42 are slightly more than halfway or so up masts 34 to keep parachute 22 well above the head of pilot 8 and above engine 16 and propeller 18. To begin a taxi and/or takeoff run, pilot 8 starts engine 16 and either pulls in or releases sea anchor 80.

Figure 5:
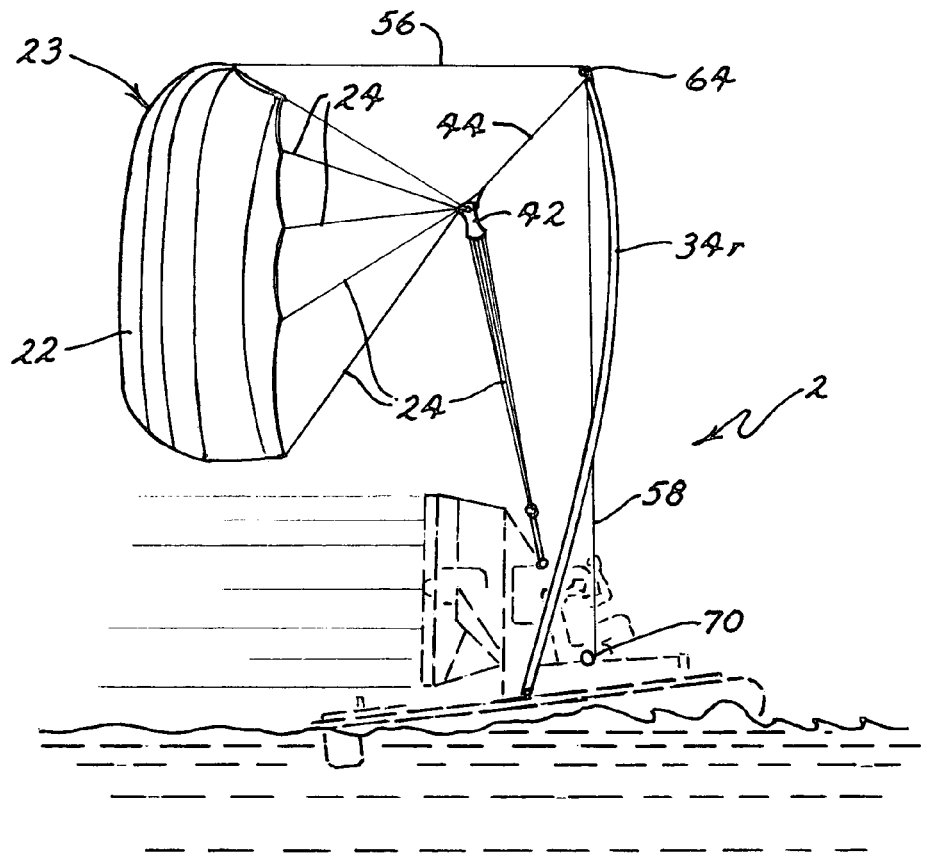
FIG. 5 is a side elevational view of the powered parachute aircraft of FIG. 1, particularly illustrating the aircraft taxiing on a body of water prior to takeoff with the parachute having been partially inflated and swung around to a trailing, non-flight, lockout position and with the vertically movable sleeves still elevated to substantially gather in the riser lines.

FIGS. 5 and 6 illustrate aircraft 2 as it taxis on the body or water or at the beginning of a takeoff run. If aircraft 2 is under partial power, as when taxiing, parachute 22 will swing around to a trailing, generally horizontal, partially inflated, non-flight position which shall be referred to herein as the lockout position. In this position, parachute 22 acts somewhat as a drag on aircraft 2 and because of its generally vertical trailing position will not generate sufficient lift to support flight of aircraft 2. This position is referred to herein as the lockout position since parachute 22 is effectively locked out in this position incapable of forming an effective wing or supporting flight due to the elevated position of sleeves 42 and the fact that riser lines 24 have been substantially gathered in by sleeves 42. However, aircraft 2 can be taxied with parachute 22 in the position shown in FIGS. 5 and 6.

It is also possible to taxi aircraft 2 with parachute 22 in the positions shown in FIGS. 1 and 2 or in FIGS. 3 and 4. In FIGS. 1 and 2, with parachute 22 still contained within storage box 30, high speed taxiing would be possible with parachute 22 forming no drag or resistance at all as it is still furled. However, if parachute 22 has been unfurled as shown in FIGS. 3 and 4, it will remain hanging in its inverted position as shown during taxiing only at low taxi speeds and little wind. As higher taxi speeds or into any appreciable wind, parachute 22 will quickly swing around to the trailing lockout position shown in FIGS. 5 and 6. However, with sleeves 42 elevated along masts 34 as shown, parachute 22 will normally be maintained in this lockout position.

Aircraft 2 can transition between taxiing and into a takeoff run as pilot 8 does a number of things. The first is to push throttle 20 forwardly to power up engine 16. As aircraft 2 gains speed, parachute 22 will begin to fill more fully with air. As shown in FIG. 5, pilot 8 then grips wing elevating cord 54 with one hand and pulls or tugs downwardly on wing elevating cord 54. Cord 54 pulls leading edge 60 of parachute 22 forwardly from its generally vertical, lockout position to a generally horizontal, overhead, flight position in which parachute 22 forms lift generating wing 23. Compare FIG. 5 which shows parachute 22 in its lockout position prior to pilot 8 having tugged on wing elevating cord 54 to FIG. 7 which shows wing 23 formed by parachute 22 in its flight position after pilot 8 has tugged on wing elevating cord 54.

However, with sleeves 42 still elevated along masts 34, the shape of wing 23 is corrupted and does not generate maximum lift. Note the crimped central portion of wing 23 shown in FIG. 8. If sleeves 42 remain elevated, aircraft 2 will still not take off due to the corruptions present in the shape of wing 23. High speed taxiing could be accomplished with wing 23 in the position shown in FIG. 7 with sleeves 42 still substantially elevated.

To takeoff as opposed to taxiing, however, after elevating wing 23 into its flight position using wing elevating cord 54, pilot 8 then actuates winch 50 to allow winch 50 to pay out or release sleeve control cables 44. The forces acting on wing 23 keep riser lines 24 taut such that the tension in riser lines 24 acting on sleeves 42 will actually force sleeves 42 downwardly relative to masts 34. As sleeves 42 lower, sleeves 42 begin to release the gathered in riser lines 24 to allow riser lines 24, and thus wing 23, to more fully expand and wing 23 to more fully inflate.

As sleeves 42 lower relative to masts 34, and as riser lines 24 are progressively released, wing 23 can continue to fill with air and inflate. When sleeves 42 reach their fully lowered position immediately adjacent anchor straps 26 for riser lines 24 as shown in FIG. 9, riser lines 24 are substantially completely released with sleeves 42 having little or no gathering effect on riser lines 24. Thus, wing 23 can now assume its normal aerodynamic shape for flight with the shape of wing 23 not being corrupted at all as indicated in FIG. 10. In this position, as aircraft 2 speed continues to build, aircraft 2 will soon have sufficient lift to take off of the body of water as shown in FIG. 9.

Once aircraft 2 is aloft with sleeves 42 in their fully lowered position, aircraft 2 will fly normally in the usual manner of a powered parachute aircraft. As shown in FIG. 11, wing 23 has its usual, uncorrupted, fully inflated shape. Pilot 8 has steering control by using the usual steering bars 14 to warp one side of wing 23 or the other using steering lines (not shown) that extend to each side of wing 23. These steering lines desirably run with riser lines 24 through sleeves 42.

An altimeter is preferably coupled to winch 50 to disable operation of winch 50 when aircraft 2 is above a certain elevation, i.e. is flying higher than an elevation of a few feet or so. Thus, in this alternative, winch 50 cannot be actuated to raise sleeves 42 while aircraft 2 is aloft.

During landing, sleeves 42 play another role. As soon as aircraft 2 touches down on a body of water or on the ground if aircraft 2 is supported by wheels rather than floats and pilot 8 has directional steering control using the rudder or steerable wheels, pilot 8 can use winch control switch 52 to actuate winch 50 to begin winding up sleeve control cables 44 on drum 48 of winch 50. This causes sleeves 42 to rise upwardly along masts 34. Desirably, winch 50 is used to elevate sleeves 42 into their fully elevated position adjacent mast tips 36, i.e. to within a foot or so of each mast 34 tip.

Figure 12:
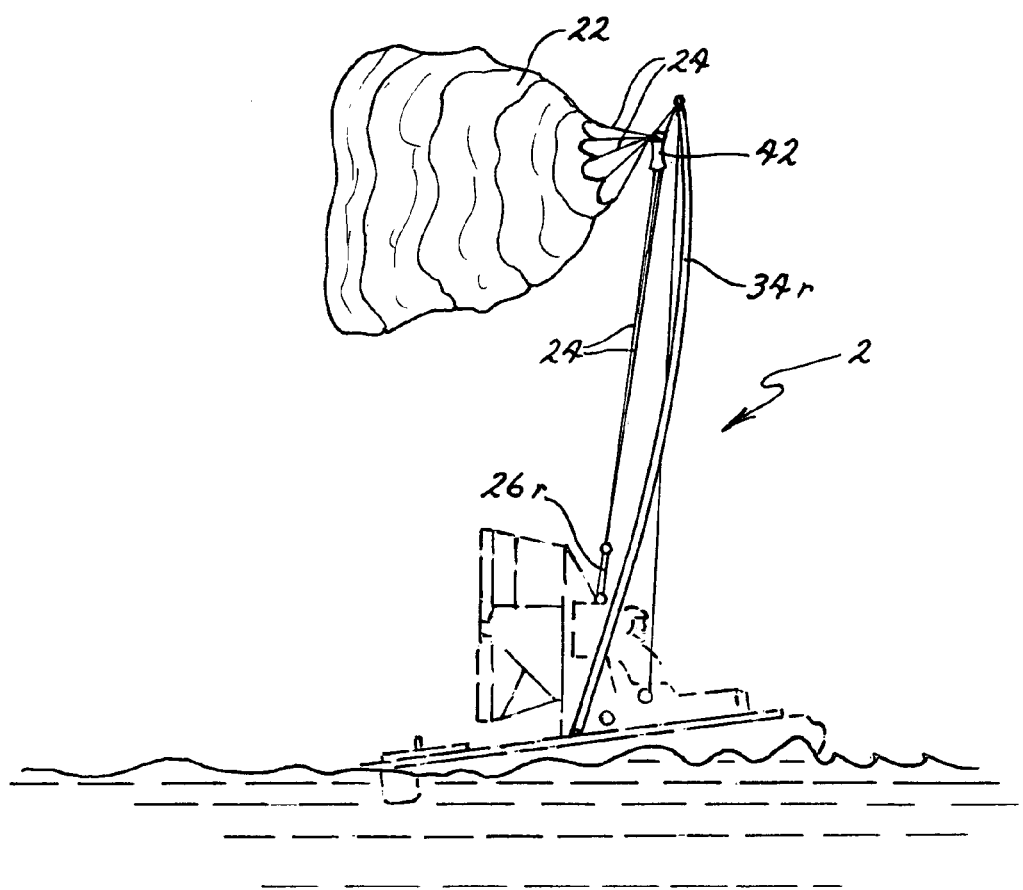
FIG. 12 is a side elevational view of the powered parachute aircraft of FIG. 1, particularly illustrating the aircraft having just landed on a body of water with the parachute having been collapsed by fully elevating the vertically movable sleeves along the masts.
Figure 13:
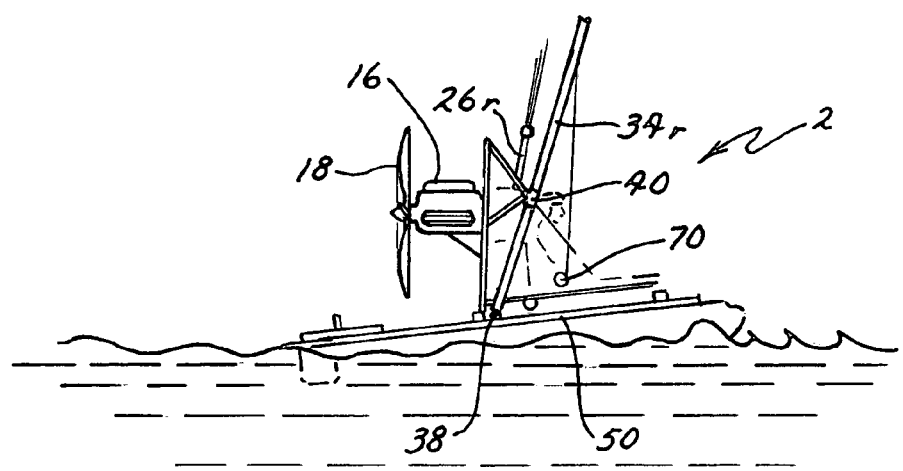
FIG. 13 is a partial side elevational view of the powered parachute aircraft of FIG. 1, particularly illustrating the aircraft with the prop guard having been omitted such that the engine and propeller are unshrouded.

As sleeves 42 ascend relative to masts 34, sleeves 42 gather in riser lines 24 to corrupt the shape of wing 23 and to cause wing 23 to collapse. As they approach the top of mast 34, sleeves 42 have substantially collapsed wing 23 and parachute 22 is now ready to invert and hang downwardly from sleeves 42. See FIG. 12 which shows sleeves 42 near the top of mast 34 at or near their fully elevated positions. Pilot 8 can then lower sleeves 42 somewhat, i.e. from their fully elevated position as shown in FIG. 12 to a partially elevated position midway or three quarters of the way up mast 34, to lower parachute 22 somewhat without any danger of having parachute 22 become entangled in propeller 18.

After landing with sleeves 42 first having been elevated along most of the length of mast 34 and then having been backed off to a partially elevated position, parachute 22 will end up in a hanging, inverted position like that shown in FIGS. 3 and 4 as the aircraft slows to a stop. Again, parachute 22 is well clear of propeller 18. In this position, it is very easy for parachute 22 to be packed into a bag by pilot 8 or to be packed into storage box 30 without entangling riser lines 24. In addition, all of the riser lines 24 will be hanging smoothly and neatly down from sleeves 42 with little danger of entanglement if the chute is packed into a bag or storage box 30. Alternatively, the pilot can simply leave parachute 22 hanging in its inverted position as shown in FIGS. 3 and 4 and aircraft 2 will be immediately ready for another takeoff.

Operational Characteristics of Aircraft 2

One characteristic of aircraft 2 of this invention is controlled wing collapse and inflation provided by the vertically displaceable or movable sleeves 42 and their effect on riser lines 24. After landing, wing 23 can be caused to collapse in a controlled fashion and to remain elevated well above engine 16 and propeller 18 and well above the body or water or the ground on which aircraft 2 has just landed. In addition, parachute 22 can be kept out of the prop blast from propeller 18 both during takeoff and landing. Thus, parachute 22 and its riser lines remain neat and straight with practically no danger of becoming entangled with themselves or other objects.

There are many advantages inherent in controlling the collapse and inflation of wing 23. For example, when landing on water, there is little wing 23 coming into contact with the water because sleeves 42 when elevated during the landing process will keep parachute 22 well above the surface of the water at all times. Thus, the problem in prior art powered parachute aircraft of wing 23 sometimes dipping into the water and quickly becoming partially or wholly submerged, as well as the labor involved in pulling such a wing out of the water, is entirely avoided.

Moreover, the preflight labor involved in preparing aircraft 2 for flight is vastly less than in prior aircraft of this type. For example, there is no need to carefully lay out parachute 22 behind aircraft 2 or to ensure that riser lines 24 are all straight and unentangled. The controlled collapse of parachute 22 during the last landing sequence leaves parachute 22 conveniently hanging from masts 34 with the taut riser lines 24 already hanging straight and unentangled. Thus, all pilot 8 need really do is quickly visually inspect parachute 22 to ensure it is hanging correctly from sleeves 42 and then takeoff. Much time and effort on the part of pilot 8 is saved in preparing aircraft 2 for flight.

Another advantage in keeping parachute 22 elevated above engine 16 and forward of propeller 18, as shown in FIGS. 3 and 4, is that prop blast has no effect on parachute 22. Thus, pilot 8 can do preflight power checks, such as engine warm up or run up, immediately prior to flight without disturbing parachute 22 or riser lines 24.

Moreover, aircraft 2 of this invention is the first aircraft having a flexible and collapsible parachute 22 that can truly launch from a body of water without arraying parachute 22 on the beach and launching from the shoreline. Because parachute 22 is suspended from masts 34 well above the water, the takeoff run can be made from any point on the body of water. This gives pilot 8 added operational flexibility in terms of first taxiing aircraft 2 to a more deserted area of a lake or the like before beginning the takeoff run. There is less likelihood of having interfering traffic appear requiring the takeoff run to be aborted.

In addition, should a pilot begin a takeoff run and then have to abort due to some unforeseen occurrence or problem, such as having a boat appear on an intersecting path with aircraft 2, pilot 8 can easily throttle back and simultaneously elevate sleeves 42 using winch 50 to quickly collapse wing 23 and abort the takeoff. Again, because wing 23 collapses in a controlled fashion, parachute 22 will simply revert to its hanging, inverted position without any danger of parachute 22 falling into the water or being entangled with propeller 18. Pilot 8 can then simply taxi back around or taxi to a new spot on the lake and begin another takeoff run without having to first potentially drag a submerged parachute out of the water.

In addition, while many aspects of this invention apply equally to an aircraft supported by floats 9 or to an aircraft 2 supported by wheels, a float supported aircraft 2 has certain operational advantages over a wheel supported aircraft. For one thing, a float supported aircraft can be kept at a lake adjacent to or close by the pilot's home and need not be trailered to an airstrip for takeoff. Even in a small town or city, the transport time to an airstrip can easily be 30 minutes or so one way. Thus, due to the elimination of the time required to transport aircraft 2 to an airstrip, a float supported aircraft is much more accessible to the pilot for flying. This in turn promotes more flying and enjoyment of aircraft 2.

Moreover, operating aircraft 2 from a body of water eliminates various safety hazards. For example, very few other aircraft are often operating in the same airspace over a lake, and thus the problems posed by interfering air traffic are largely avoided. Similarly, many of the hazards from fixed obstructions, such as poles, wires, etc., are not found immediately adjacent a lake or over the lake. Thus, there is less danger in aircraft 2 colliding with such a fixed obstruction.

Since sleeves 42 when properly controlled are able to keep parachute 22 well above engine 16 and propeller 18 during the controlled wing collapse provided by sleeves 42, it would be possible to eliminate prop guard 32 surrounding engine 16 and/or propeller 18. Since weight is crucial in this type of aircraft, the weight savings of approximately 30 lbs. or so achieved by eliminating prop guard 32 would be very beneficial. In fact, if the weight of aircraft 2 is kept below 254 lbs., then certain proposed licensing regulations for pilots of ultralight aircraft, currently known as the Sport Pilot Rule, would not apply to aircraft 2. This would promote the sale and operation of such aircraft 2 by making it less burdensome for pilots to be licensed to fly such aircraft.

Another benefit in eliminating prop guard 32 is to improve the efficiency of propeller 18. Tests show an increase in thrust of 8% to 12% due solely to the elimination of prop guard 32 and the elimination of the dirty or disturbed air created by prop guard 32. As a consequence, smaller and lighter internal combustion engines 16 could be used on aircraft 2 without prop guards 32, thereby further reducing the weight for aircraft 2. For example, the current standard engine 16 on aircraft 2 is typically one with a displacement of 582 cc. With improved propeller efficiency, a smaller engine, e.g. an engine 16 having a 507 cc displacement, could be used in place of the larger engine 16.

Masts 34 also provide desirable handling characteristics separate and apart from the characteristics provided by vertically movable sleeves 42. For example, wing 23 is effectively tethered to the two masts by flexible connections, i.e. the length of riser lines 24 extending between sleeves 42 and wing 23 as well as by cord 54. Thus, when turning while taxiing, parachute 22 will not have a tendency to swing out as widely in a turn as in a prior art aircraft of this type and thus will not have a tendency to dip one side of wing 23 into the water. Thus, the vertically movable sleeves 42 could be omitted from aircraft 2 and the use of masts 34 with a flexible connection or tether between masts 34 and wing 23 provides advantages of its own.

Various modifications of masts 34 are possible. For example, one mast 34 could be used instead of two. However, at least for a float supported aircraft having no weighted keel as is true of aircraft 2 shown in the drawings, the use of two laterally spaced masts 34 is preferred for balance and stability. While masts 34 are designed to be slightly shorter than the normal flight position of wing 23, masts 34 could be taller such that tips 36 of mast 34 are above wing 23 during flight. In either case, the forward raking of masts 34 is preferred to keep masts 34 forward of wing 23 and/or riser lines 24 to avoid having the shape of wing 23 be disturbed during flight by inadvertent contact between masts 34 and wing 23. In addition, masts 34 that telescope inwardly during flight could be used (i.e. a mast with a usual 20 foot length prior to launch could telescope inwardly into a 9 foot length during flight) to reduce the drag afforded by masts 34 during flight.

Wing elevating cord 54 is also preferably used because it helps elevate wing 23 between the lockout and flight positions without putting too much strain on masts 34. However, wing elevating cord 54 could be omitted. Then, wing 23 would transition between the lockout and flight positions as aircraft 2 powers up, but the strain imposed on masts 34 would be much greater. Wing elevating cord 54 helps pilot 8 get parachute 22 up into the flight position at lower speeds thus easing the strain on masts 34.

In aircraft 2, sleeves 42 allow riser lines 24 to remain tensioned even as parachute 22 collapses during landing or even when aircraft 2 is at rest. This helps prevent riser lines 24 from becoming tangled and is one desirable aspect of this invention. Normally, during taxiing or takeoff, the force of the air acting on parachute 22 will keep riser lines 24 under tension. However, in this invention, even as parachute 22 collapses after landing and falls down around sleeves 42, the weight of parachute 22 hanging downwardly from sleeves 42 still keeps riser lines 24 under tension at substantially all times. Other ways of maintaining tension on riser lines 24 during and after landing could also be used.

Because sleeves 42 are operated from a common winch 50, their upward and downward motions are synchronized with one another to permit wing 23 to symmetrically inflate and collapse. If wing 23 were to inflate asymmetrically, aircraft 2 would tend to steer or yaw in the direction of the more fully inflated side of wing 23. This is avoided by synchronizing the motion of sleeves 42 with one another. Such synchronization could be accomplished in a number of ways and not just by operating sleeves 42 from a common winch 50.

Various other modifications of this invention will be apparent to those skilled in the art. Thus, the scope of this invention is to be limited only by the appended claims.

I claim:

1. A parachute supported aircraft, which comprises:
   (a) a frame having at least one seat for carrying at least a pilot;
   (b) a parachute forming a collapsible and inflatable wing;
   (c) a plurality of riser lines connecting the parachute to the frame;
   (d) at least one gathering device slidably surrounding substantially all the riser lines for gathering in substantially all the riser lines as the device and substantially all the riser lines slide relative to one another in a first direction and for releasing substantially all the gathered in riser lines as the device and substantially all the riser lines slide relative to one another in an opposed second direction, wherein the riser line gathering produced by the device provides controlled wing collapse during landing and the riser line releasing permitted by the device provides controlled wing inflation during take-off; and
   a control switch for allowing the pilot to selectively start and stop the relative sliding motion between substantially all the riser lines and the gathering device.

2. A parachute supported aircraft, which comprises:
   (a) a frame having at least one seat for carrying at least a pilot, wherein the frame carries an engine and propeller;
   (b) a parachute forming a collapsible and inflatable wing having sufficient lift for self-sustaining flight when the engine and propeller are in operation;
   (c) a plurality of riser lines connecting the parachute to the frame; and
   (d) at least one sleeve supported for vertical movement upwardly and downwardly relative to the frame, the sleeve being located relative to the frame and the parachute such that the riser lines pass through the sleeve as the riser lines extend between the parachute and the frame, wherein the sleeve as it rises relative to the frame progressively gathers in the riser lines to thereby collapse the wing and the sleeve as it lowers relative to the frame progressively releases the riser lines to allow separation of the riser lines to permit the wing to inflate.

3. The aircraft of claim 2, further including at least one mast extending upwardly from the frame, and wherein the sleeve is supported from the mast.

4. The aircraft of claim 3, wherein the sleeve is supported from the mast for vertical movement relative to the mast.

5. The aircraft of claim 4, wherein the mast includes a first pulley, and further including at least one control cable extending from the frame up around the first pulley on the mast and then downwardly to connect to the sleeve for controlling vertical movement of the sleeve relative to the mast.

6. The aircraft of claim 5, wherein the control cable is connected to a winch on the frame for winding up the control cable or for paying the control cable out, the control cable pulling the sleeve upwardly relative to the mast as the control cable is wound up on the winch and the control cable permitting the sleeve to lower relative to the mast as the control cable is payed out from the winch.

7. The aircraft of claim 6, wherein the winch is selectively operable through a winch control switch to allow the pilot to selectively move the sleeve upwardly and downwardly relative to the mast to thereby manually control the collapse and inflation of the wing.

8. The aircraft of claim 5, wherein the mast includes a second pulley, and further including a wing elevating cord extending from the frame up around the second pulley on the mast and then rearwardly to connect to the wing for pulling the wing upwardly relative to the mast to help elevate the wing into an overhead flight position.

9. The aircraft of claim 8, wherein the wing elevating cord extends adjacent to the pilot's seat for allowing the pilot to grab and pull downwardly on the cord to help elevate the wing.

10. The aircraft of claim 9, wherein the wing elevating cord is connected to a tensioning device on the frame for taking up any slack created in the wing elevating cord as the pilot grabs and pulls downwardly on the cord.

11. The aircraft of claim 8, wherein the wing formed by an inflated parachute has upper and lower leading edges, and wherein the wing elevating cord connects to the upper leading edge of the wing.

12. The aircraft of claim 8, wherein the wing elevating cord attaches to the wing at two laterally spaced points.

13. The aircraft of claim 12, wherein the wing has laterally spaced wing tips on either side of a longitudinal centerline of the wing, and wherein each point of attachment of the wing elevating cord to the wing is located between the centerline of the wing and one wing tip.

14. The aircraft of claim 12, wherein the wing has laterally spaced wing tips on either side of a longitudinal centerline of the wing, and wherein each point of attachment of the wing elevating cord to the wing is located outboard on the wing at least midway between the centerline of the wing and one wing tip.

15. The aircraft of claim 3, further including a pair of masts extending upwardly from the frame, and further including a pair of sleeves with one sleeve being supported from each mast with each sleeve having at least a portion of the riser lines passing therethrough.

16. The aircraft of claim 15, wherein the masts extend laterally outwardly relative to the frame as the masts extend upwardly such that the distance between the masts increases as the masts extend upwardly.

17. The aircraft of claim 16, wherein the masts are also inclined forwardly relative to the frame.

18. The aircraft of claim 15, wherein the masts are inclined forwardly relative to the frame.

19. The aircraft of claim 2, further including a selectively operable control cable extending between the frame and the sleeve for adjusting the vertical position of the sleeve relative to the frame.

20. The aircraft of claim 2, wherein the parachute is flexibly tethered to the mast between the frame and the parachute as the riser lines connect the parachute to the frame.

21. The aircraft of claim 2, further including a selectively operable wing elevating cord extending between the frame and the parachute for helping pull the wing into an overhead flight position.

22. The aircraft of claim 2, wherein the engine and propeller are unshrouded.

23. The aircraft of claim 2, wherein the frame includes floats to allow the aircraft to be operated on a body of water.

24. A parachute supported aircraft, which comprises:
 (a) a frame having at least one seat for supporting at least a pilot;
 (b) a parachute coupled to the frame by a plurality of riser lines for allowing the parachute to inflate and form a wing for lifting the frame;
 (c) a pair of upwardly extending masts coupled to the frame, wherein each mast supports a vertically movable sleeve receiving a group of riser lines; and
 (d) control cables connected to a winch to raise and lower the sleeves to allow the pilot to selectively collapse and inflate the wing in a controlled fashion.

25. The aircraft of claim 24, further including a wing elevating cord selectively usable by the pilot to the wing upwardly relative to the masts.

26. The aircraft of claim 2, wherein the sleeve has an elongated tubular form.

27. The aircraft of claim 26, wherein the tubular sleeve has a flared or trumpet shaped top and bottom.

28. The aircraft of claim 2, wherein the sleeve has a flat ring shaped form.

* * * * *

UNITED STATES PATENT AND TRADEMARK OFFICE
CERTIFICATE OF CORRECTION

PATENT NO. : 7,048,227 B2 Page 1 of 1
APPLICATION NO. : 10/705682
DATED : May 23, 2006
INVENTOR(S) : Carl K. Towley, III et al.

It is certified that error appears in the above-identified patent and that said Letters Patent is hereby corrected as shown below:

Col. 13, Line 48, before "a control switch" insert -- (e) --;
Col. 16, Line 13, change "to the wing" to -- to pull the wing--.

Signed and Sealed this

Twenty-second Day of August, 2006

JON W. DUDAS
*Director of the United States Patent and Trademark Office*